United States Patent [19]
Kronschnabel et al.

[11] Patent Number: 5,896,828
[45] Date of Patent: Apr. 27, 1999

[54] METHOD AND APPARATUS FOR CLEANING MILKING PIPELINES AND MILKING EQUIPMENT

[75] Inventors: Gerald L. Kronschnabel, Madison; Mofazzal H. Chowdhury, Sun Prairie, both of Wis.

[73] Assignee: Alfa Laval Agri Inc., Waunakee, Wis.

[21] Appl. No.: 08/861,838

[22] Filed: May 22, 1997

[51] Int. Cl.⁶ .................................................. A01J 7/02
[52] U.S. Cl. .................................... 119/14.46; 119/14.02
[58] Field of Search ............................ 119/14.01, 14.02, 119/14.08, 14.14, 14.03, 14.46

[56] References Cited

U.S. PATENT DOCUMENTS

| | | |
|---|---|---|
| 3,111,112 | 11/1963 | Fjermstad . |
| 3,116,743 | 1/1964 | Sparr . |
| 3,139,107 | 6/1964 | Bender . |
| 3,191,576 | 6/1965 | Bender . |
| 3,228,374 | 1/1966 | Sampson et al. . |
| 3,385,265 | 5/1968 | Schrader . |
| 3,506,034 | 4/1970 | Branton . |
| 3,658,441 | 4/1972 | Bender . |
| 4,061,504 | 12/1977 | Zall et al. ................................. 134/95 |
| 4,222,346 | 9/1980 | Reisgies ............................... 119/14.18 |
| 4,452,268 | 6/1984 | Icking et al. ............................. 137/240 |
| 4,516,530 | 5/1985 | Reisgies et al. ....................... 119/14.08 |
| 4,516,592 | 5/1985 | Schultz et al. . |
| 4,572,105 | 2/1986 | Chodhury et al. .................... 119/14.18 |
| 5,167,201 | 12/1992 | Peles . |
| 5,275,124 | 1/1994 | van der Lely et al. . |
| 5,361,722 | 11/1994 | Tecza ................................... 119/14.03 |
| 5,390,627 | 2/1995 | Van Der Berg et al. ............. 119/14.08 |
| 5,507,247 | 4/1996 | Tecza et al. .......................... 119/14.03 |
| 5,606,932 | 3/1997 | Van Der Lely ....................... 119/14.14 |

OTHER PUBLICATIONS

Anton Muljadi, et al., "Air-injected Clean-In-Place (CIP) for Milking System . . . " Paper No. 963019, 1996 ASAE Annual International Meeting, Jul. 15, 1996.
Brochure published by Germania Dairy Automation, Inc. "How do you Wash a Large Parlor?", 1992.
De Laval Service Manual, Alfa-Laval Agri, Inc., Jul. 1989.
Statement by Inventors Concerning Prior Milking Equipment Washing Systems.

*Primary Examiner*—Thomas Price
*Attorney, Agent, or Firm*—Foley & Lardner

[57] ABSTRACT

In a milking parlor having a milk line to which milking clusters are connected and a wash line to which clean-in-place washer units are connected, milk from the milk line is directed through a pipeline to a single receiver tank that is maintained under a vacuum draw during the milking operation. Milk from the receiver tank is periodically pumped to a bulk tank. During wash up, the receiver tank is filled with wash water, and wash water is then pumped from the receiver tank through the milk pipelines leading to the bulk tank and then back by return lines to the receiver tank, and wash water is also pumped from the receiver tank to the wash line. The wash water from the wash line passes through the washer units, which are now connected to the teat cups of the milking cluster, thence to the milk line, and back through the milk line and the milk pipeline back to the receiver tank. Washing action may be enhanced by periodic injection of air into the wash supply line connected to the wash line to provide slugs of wash water that pass through the teat cup clusters and associated equipment.

24 Claims, 7 Drawing Sheets

METHOD AND APPARATUS FOR CLEANING MILKING PIPELINES AND MILKING EQUIPMENT

FIELD OF THE INVENTION

This invention pertains generally to the field of milking equipment and particularly to the cleaning of milking pipelines and other milking equipment in milking parlors.

BACKGROUND OF THE INVENTION

In large dairies, cows are typically milked in milking parlors in which several cows are milked simultaneously. When one group of cows has finished milking, that group is let out of the parlor and another group of cows is let in to be milked. The milk from each cow is typically drawn from the teat cup cluster—attached to the cow's udder—through a milk hose to a common milk pipeline which is under a vacuum draw. The milk from several cows is drawn through the pipeline to a common receiver tank where the milk is discharged from the pipeline into the tank. The receiver tank is connected to a vacuum pump so that the interior of the receiver tank is under vacuum pressure, thereby drawing the milk from the milk pipeline into the receiver tank. Periodically, the milk from the receiver tank is pumped by a milk pump through pipelines to a large bulk tank where it is held and cooled while awaiting transfer to a milk tank truck. The receiver tank is typically mounted in the parlor at the end of the common milk line, whereas the bulk tank is usually located in another room or building which is typically a substantial distance away from the cows in the milking parlor. In the typical double-herringbone milking parlor, a receiver tank and milk pump are located in the parlor at the end of the milk line on each side of the parlor.

When all of the cows in the herd have completed milking, the milking equipment and pipelines must be cleaned and sanitized before the next shift of milking begins. Commonly, a wash line is installed above the milking stations at which the cows are milked. When the milking shift has been completed, the dairyman typically connects the teat cups in the teat cup cluster to a clean-in-place unit washer or a wash manifold which is connected by a hose to the wash line. Wash water mixed with sanitizing chemicals in a wash tank or sink is then supplied to the wash line, through the clean-in-place manifold, the teat cups and the milk hose to the milk line; the wash water in the milk line is then drawn back to the receiver tank and pumped back by the milk pump through the pipelines that extend to the bulk tank. Bypass valves are opened to allow the wash water to recirculate rather than being passed into the bulk tank, and the recirculated water is eventually discharged to a drain. A connection may be made between the wash line and the milk line through a valve which is opened to provide some direct flow of wash water from the wash line to the milk line to provide a more thorough cleaning of the milk line.

In some systems, a separate wash water holding tank is provided in addition to the receiver tanks and the wash sink. The wash tank holds a large quantity of hot wash water and sanitizing chemicals. A pump is connected to the wash tank to pump the wash water into the wash lines. The relatively large capacity of the wash tank combined with the pressure applied to the wash water by the pump allows a vigorous flow of wash water to be provided to the wash lines and thence to the various milk pipelines to thoroughly clean the pipelines. To obtain enhanced cleaning action, air injector systems have been developed which allow air to be injected into the wash lines so that the wash water is driven along in "slugs" separated by air pockets to enhance the scrubbing and cleaning action of the wash water.

While such conventional washing systems adequately clean the various milk pipelines and related equipment, the washing lines and equipment add significant costs to milking parlor construction. The wash lines, wash sinks, wash tanks, receiver tanks, connectors and other equipment typically are formed of expensive stainless steel to ensure maximum cleanliness and durability. The milk pumps provided at the receivers which are located at the end of each milk pipeline for each side of the parlor must be of the highest quality. In addition to the significant capital cost of the long lengths of washing pipeline that are required for typical milking systems, the number of pipes through which the wash water must pass and the length of the pipes results in significant loss of heat from the hot wash water passing through the pipes, with the result that operating costs for hot water heating are significant. The space within the milking parlor that is physically occupied by the various wash lines also constrains the design of the parlor and reduces the space available for other equipment within the parlor. The long lines and the capacitors of the receiver tanks and wash tank has also required that large amounts of wash water be used during the wash-up process, which is a significant concern in areas where water is rationed or particularly expensive.

Some milking parlors have been installed in which the receiver tanks at the end of each of the two milk lines (for a double sided parlor) have been eliminated, and the large wash water holding tank has been employed also to serve as a receiver tank during milking. In these parlors, each of the two milk lines was connected to a single common line that extends to the wash/receiver tank. A milk pump is used to pump the accumulated milk from the wash/receiver tank to the bulk tank. During wash-up, a separate wash pump is used to pump wash water from the wash/receiver tank through the wash lines and the milking units and back through the milk lines to the wash/receiver tank. Because of the relatively long distance between the milking units and the wash/receiver tank (typically located outside of the milking parlor) difficulties may be encountered in obtaining adequate vacuum draw on the milk in the lines leading to the wash/receiver tank, particularly where the common milk line enters the receiver tank below the level of accumulated milk in the tank or where it enters at a higher level but with the requirement for a vertical section of milk pipeline through which milk must be drawn against gravity.

SUMMARY OF THE INVENTION

In accordance with the present invention, a washing system for milking parlors is provided which significantly reduces the amount of pipelines and other equipment required to provide adequate washing of the milk pipelines while providing equivalent or improved cleaning performance. The system requires the use of less water and washing chemicals than conventional systems and maintains the temperature of the wash water better than conventional systems because the wash solution remains in the pipeline, not in ancillary wash vats. The lines carrying hot water to and from the milking parlor can be placed together to minimize heat loss and allow the lines to be commonly insulated. For each row of milking stations in a parlor, the present invention eliminates the need for the separate receiver tank at the end of the milk line for that row as well as the milk pump associated with each such receiver tank. A single pump may be utilized for both pumping milk and pumping wash water.

In the present invention, a single large receiver tank serves as the receiver for both rows of milking stations in a double row (e.g., double herringbone) type parlor, as well as serving as the wash tank during the wash up operation. During milking, milk is drawn through the teat cup clusters to the milk line, either directly through a milk hose connection or through an intermediate weigh jar. Where a weigh jar is used, a connecting line extends from the interior of the weigh jar to the wash line which serves as a vacuum line during milking. The milk line is connected by a pipeline to the single receiver tank, which is itself connected to a vacuum pump so that the interior of the receiver tank is maintained under vacuum pressure. Thus, the milk from the cows is drawn through the milk line and the connecting pipeline under vacuum draw to the receiver tank. The milk lines from each side of the parlor extend individually to the receiver tank, eliminating any possible interference between the flow of milk or wash water in the lines. Each milk line enters the receiver tank at a position above the level of milk in the tank, and the tank is preferably positioned so that milk in the lines does not have to flow vertically against gravity.

Periodically—e.g., after each group of cows is milked in the parlor—a milk pump connected to the receiver tank is turned on to pump milk out of the tank through a milk transfer pipeline to a bulk tank where the milk is cooled and stored awaiting pickup by a milk tank truck (or directly to the tank of the milk tank truck which then effectively functions as a bulk tank). When a shift of milking is completed (typically two or three shifts of milking may occur each day), the dairyman connects the teat cups of each milking cluster to a washer unit which is connected by a hose to the wash line. At this time all of the milk has been pumped from the receiver tank into the bulk tank. A valve at the bulk tank is then switched to prevent any further flow from the milk pipeline into the bulk tank. The receiver tank is then filled with hot wash water from a water heater and sanitizing chemicals are added to the wash water within the receiver tank. When the tank is filled to a desired level, the milk pump is now turned on and the wash water from the tank is supplied under pressure through the milk outlet pipe line to a main three-way valve which, during wash-up, is now switched so that it alternately provides the wash water to the milk pipe line leading therefrom toward the bulk tank and to a wash water supply line which leads to the wash line. The valve at the bulk tank is connected to a wash water return line which extends from the bulk tank back to communication with the interior of the receiver tank. Thus, the wash water pumped through the pipeline leading from the receiver tank to the bulk tank passes through the valve at the bulk tank and then through the return line back to the receiver tank.

Similarly, the wash water from the main three-way valve that is delivered by the supply line to the wash line now passes from the wash line to the clean-in-place washer units which are connected to the teat cups of each teat cup cluster, so that wash water passes through the teat cup clusters and through the hoses (and weigh jars where used) connected to the clusters and thence back to the milk line. In addition, a by-pass connecting line with a restricter in it extends from the wash line to the milk line so that wash water is diverted directly from the wash line to the milk line to provide wash water through the entire length of the milk line. The wash water in the milk line is drawn back under vacuum into the interior of the receiver tank. Where weigh jars are used, an additional three-way valve may be connected in the first return line and have a connecting line extending to the receiver tank. This three-way valve is switched during milking so that the vacuum pressure within the receiver tank is applied to the section of the wash supply line that extends to the wash line, thereby placing the wash line under vacuum draw, with the weigh jars being connected to the wash lines so that the weigh jars are also under vacuum draw.

The single receiver tank can be and preferably is located outside of the milking parlor so that it does not interfere with any of the milking operations and takes up no space within the parlor itself. The various milk pipelines, wash lines and return lines extending to the milking lines and the wash lines in the parlor may be run together from the two sides of the parlor to the position outside the parlor where the single receiver tank is located, and these lines may be mounted in close proximity and insulated so that the heat from each line is conserved during the washing operation.

To provide more vigorous washing action, an air injector can be connected in the wash supply line and the main three-way valve switched to a position where the wash water from the receiver tank pumped by the milk pump is passed only to the supply line and not through the portion of the milk pipeline leading to the return line. The air injector can be operated to periodically provide air to the supply line so that the wash water moves through the supply line to the wash line and thence to the teat cups, etc., in "slugs" to enhance the washing action. It is further preferred, in accordance with the present invention, that a means be used for providing a pulse of pressurized air to the wash supply line as each slug of wash water passes to provide initial acceleration of the slug, with the supply line thereafter being opened to atmospheric air to allow the slug of water to proceed normally. In this manner, the slugs of water can be accelerated to move more readily through the relatively long lengths of supply lines leading to the wash line.

After the washing operation has been completed, the main three-way valve can be closed so that no wash water from the milk pump will pass therethrough, and a drain valve between the milk pump and the main three-way valve can be opened to pass the wash water pumped from the receiver tank to a drain. In this manner the receiver tank can be rapidly drained of the wash water.

As is typical, the foregoing hot wash cycle may be preceded by a pre-rinse with cold water to wash out the majority of the milk retained in the various hoses and lines before the receiver tank is filled with hot wash water, and after the hot wash cycle is completed a post rinse may be carried out to remove any residue of sanitizing chemicals from the milk hoses and lines and the receiver tank. At this point, the equipment is ready for another milking shift, and the various valves may be returned to their initial positions to allow milking to proceed.

Further objects, features and advantages of the invention will be apparent from the following detailed description when taken in conjunction with the accompanying drawings.

DETAILED DESCRIPTION OF THE INVENTION

Figure 1:
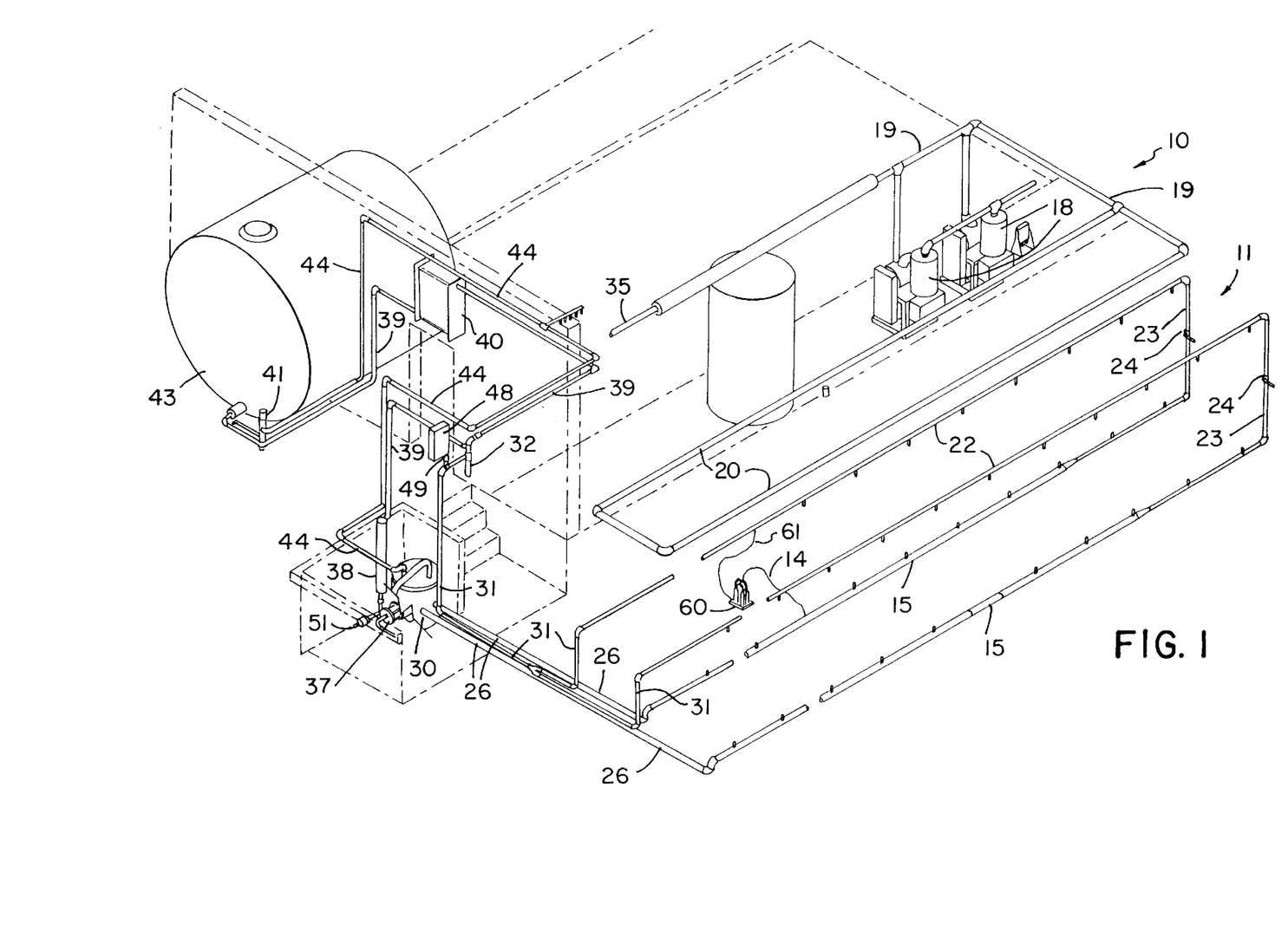
FIG. 1 is a simplified perspective view of an exemplary milking parlor incorporating the washing system of the present invention.

With reference to the drawings, milking parlor and related equipment in a dairy in accordance with the present invention is shown generally at 10 in FIG. 1 The milking parlor is generally located at the position labeled 11 in FIG. 1, and may be of a conventional construction, such as a double herringbone in which several milking stalls or stations are positioned in two rows separated by an alleyway in which the milker works. Each milking station includes a teat cup cluster 13 which is connected by a milk hose 14 to a milk line 15. For convenience of illustration, only one milking station is illustrated in FIG. 1, it being understood that there are several milking stations in a row having teat cup clusters 13 connected by milk hoses 14 to the milk line 15, and that a second milk line 15 on the other side of the milking parlor also has a plurality of milking clusters connected to it. As is conventional, the dairy 10 has vacuum pump(s) 18 which provide a vacuum draw on vacuum supply lines 19. The lines 19 extend to pulsator vacuum lines 20 to which are connected pulsators (not shown) which provide the pulsation vacuum in a conventional fashion to the teat cup inflations of the cluster 13. All such equipment is conventional and is not shown in FIG. 1 for simplicity.

As also illustrated in FIG. 1, each side of the parlor 11 has an overhead wash line 22. Each wash line 22 is connected to the milk line 15 below it by a bypass line 23 in which is connected a shut-off valve 24 (e.g., butterfly type).

The milk drawn from the milking clusters 13 into the common milk lines 15 is drawn under vacuum to milk pipelines 26. The lines 26 extend separately out of the milking parlor to a separate room containing a common receiver tank 30 but do not join together into a common line. Each line 26 extends to the receiver tank 30. As illustrated in FIG. 1, the milk pipelines 26 preferably run adjacent to one another from the parlor to the position at which they engage the receiver tank 30. In addition, wash water supply line(s) 31 extend from the wash lines 22 out of the parlor and into the separate room to a position adjacent to the receiver tank 30. The wash supply line(s) 31 may be joined to a single wash supply line 31, as shown, which terminates at a main valve 32 (e.g., three-way valve as discussed further below).

The vacuum in the vacuum supply line 19 is also provided on a line 35 into the room containing the receiver tank 30 and, as discussed below, is connected to the receiver tank to provide a vacuum to the interior of the tank. The vacuum draw on the interior of the receiver tank 30 provides vacuum draw on the milk lines 15 to pull the milk from the clusters 13 into the receiver tank.

When milking for a group of cows is completed, a milk pump 37 is turned on to pump milk out of the receiver tank 30 through a milk filter 38 and thence through a milk pipeline 39 to the three-way main valve 32. The milk on the line 39 passes through the three-way main valve 32 and continues on the line 39 through a milk cooler 40 (e.g., a plate cooler) and then through a valve 41 into a bulk tank 43 where the milk is chilled and stored awaiting transfer to a milk tank truck. A wash water return line 44 is also connected to the valve 41 and extends back therefrom to the receiver tank 30 where it is in communication with the receiver tank. As best shown in the more detailed view of FIG. 2, the vacuum supply line 35 extends to a trap 46, and the interior of the trap is connected by a line 47 to the top of the receiver tank 30 to provide vacuum draw to the interior of the receiver tank. The trap 46 serves to collect any wash water or milk which may have been incidently drawn out of the receiver tank through the line 47 so that this liquid does not get drawn up into the line 35.

Figures 2, 4:
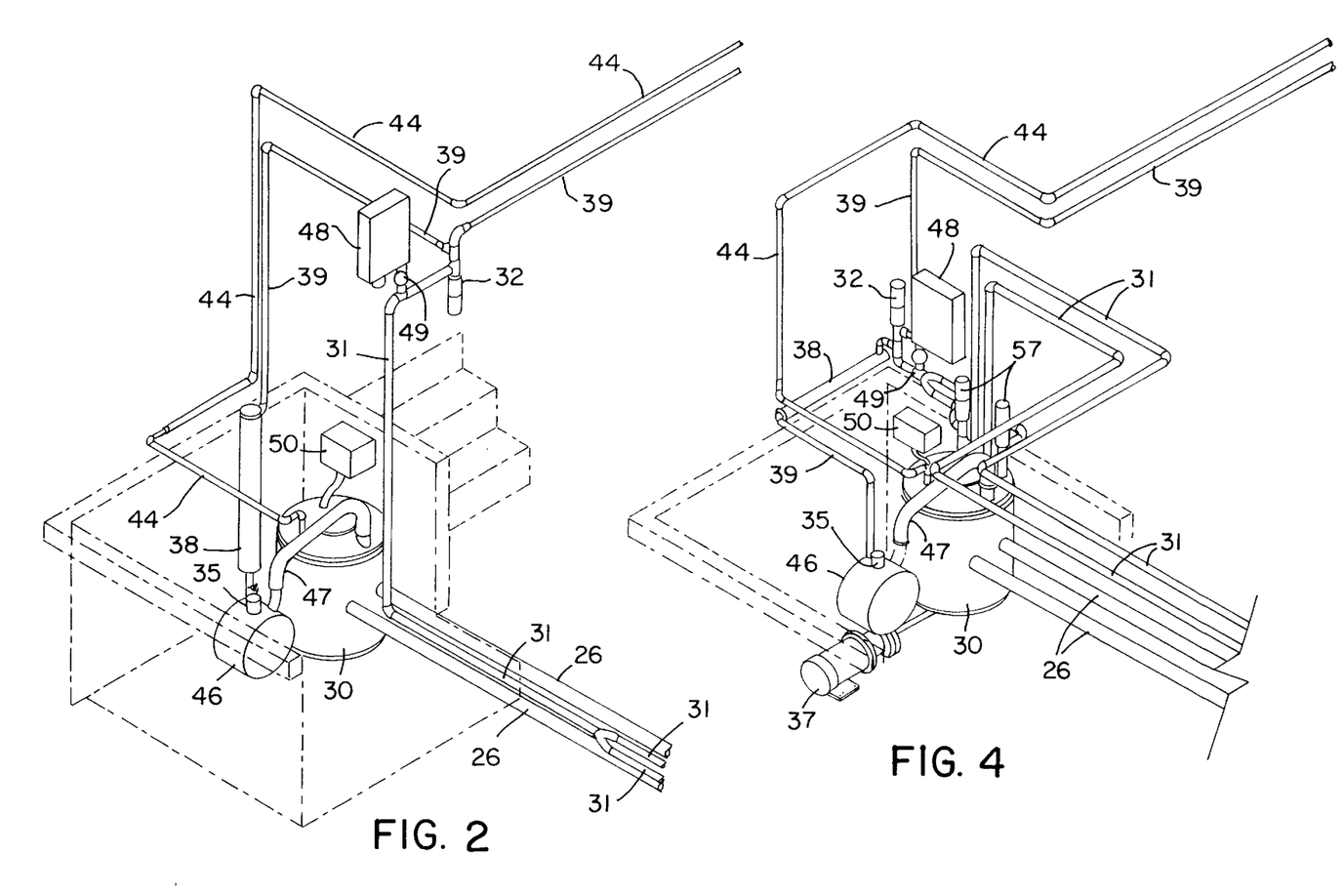
FIG. 2 is a more detailed view of the receiver tank and associated equipment and pipelines in the washing system of FIG. 1.
FIG. 4 is a more detailed view of the receiver tank and associated equipment and pipelines for the washing system of FIG. 3.

As also illustrated in FIG. 2, an air injector system 48 including a valve 49 which is connected into the wash supply line 31 at a position ahead of the valve 32. As explained further below, the air injector system 48 allows air to be injected into the wash supply line 31 to provide slugs of wash water to enhance cleaning action.

Not shown in FIG. 1 and 2 are conventional hot water supply lines and cleansing liquid supply systems which are connected to the receiver 30 to supply hot water and cleansing chemicals to the receiver 30 when it is acting as a wash tank. Such systems 50 are conventional and any suitable hot water supply system and cleansing supply may be utilized. An automatic drain valve 51 is connected in the line 39 and can be operated to drain the receiver tank 30 of wash water at the end of the washing cycle.

Figure 3:
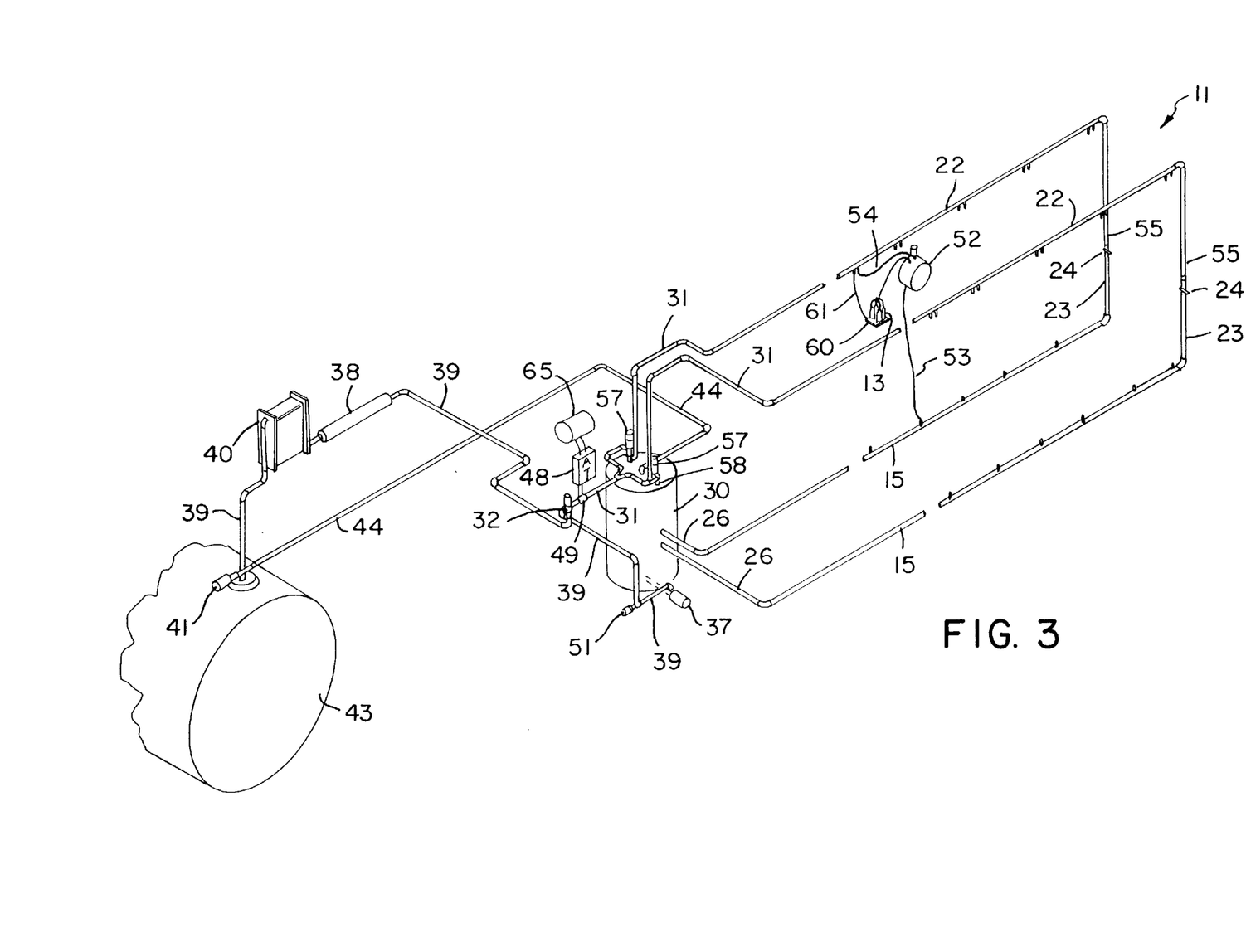
FIG. 3 is a simplified schematic view of an exemplary milking parlor incorporating the washing system of the present invention adapted for use with parlors that utilize weigh jars.

FIG. 3 is a simplified illustration of a parlor as in FIG. 1, with like components having like numerals, but configured to allow use of weigh jars at each of the milking stations. As illustrated in FIG. 3, a weigh jar 52 is connected to receive milk from the milk line 14 extending from the milking cluster 13. Milk accumulated in the weigh jar 52 is discharged on a hose 53 to the milk line 15. To maintain the interior of the weigh jar 52 under vacuum, the weigh jar 52 is connected by a hose 54 to the wash line 22 which, during milking, is supplied with vacuum. For the milking parlor configuration as shown in FIG. 3, a flow restrictor 55 is connected in the bypass line 23.

To allow vacuum to be supplied to the wash lines 22 during milking, the system of FIG. 3 additionally utilizes two three-way valves 57 which are connected in the wash supply lines 31 and are also connected to stub lines 58 (best shown in FIG. 4) which extend to the top of the receiver 30. As explained further below, the valves 57 can be switched so that the lines 31 are put in communication with the interior of the receiver tank 30, thus supplying vacuum draw to the lines 31, and thus the wash lines 22, during milking.

In other respects, the milking system of FIGS. 3 and 4 is functionally identical to that of FIG. 1 and 2. An explanation of the functioning of either system will be provided with respect to the schematic diagrams shown in FIGS. 5–8. For both systems, cleaning in place of each of the teat cup clusters 13 at each milking station is provided by means of a washer unit 60 connected by a line 61 to the wash line 22. Such units are conventional and in standard use.

As illustrated in FIGS. 1 and 3, the milk pipelines 26 are preferably at the same level as or lower than the milk lines 15 through the entire length of the pipelines 26 so that milk in these lines never has to be drawn upwardly against gravity. This may require, as illustrated in FIGS. 2 and 4, that the receiver tank be mounted on a surface that is at a lower level then the floor of the milking parlor, as by being locating in a pit which has a floor a few feet below the adjacent floor and below the floor of the milking parlor.

Figure 5:
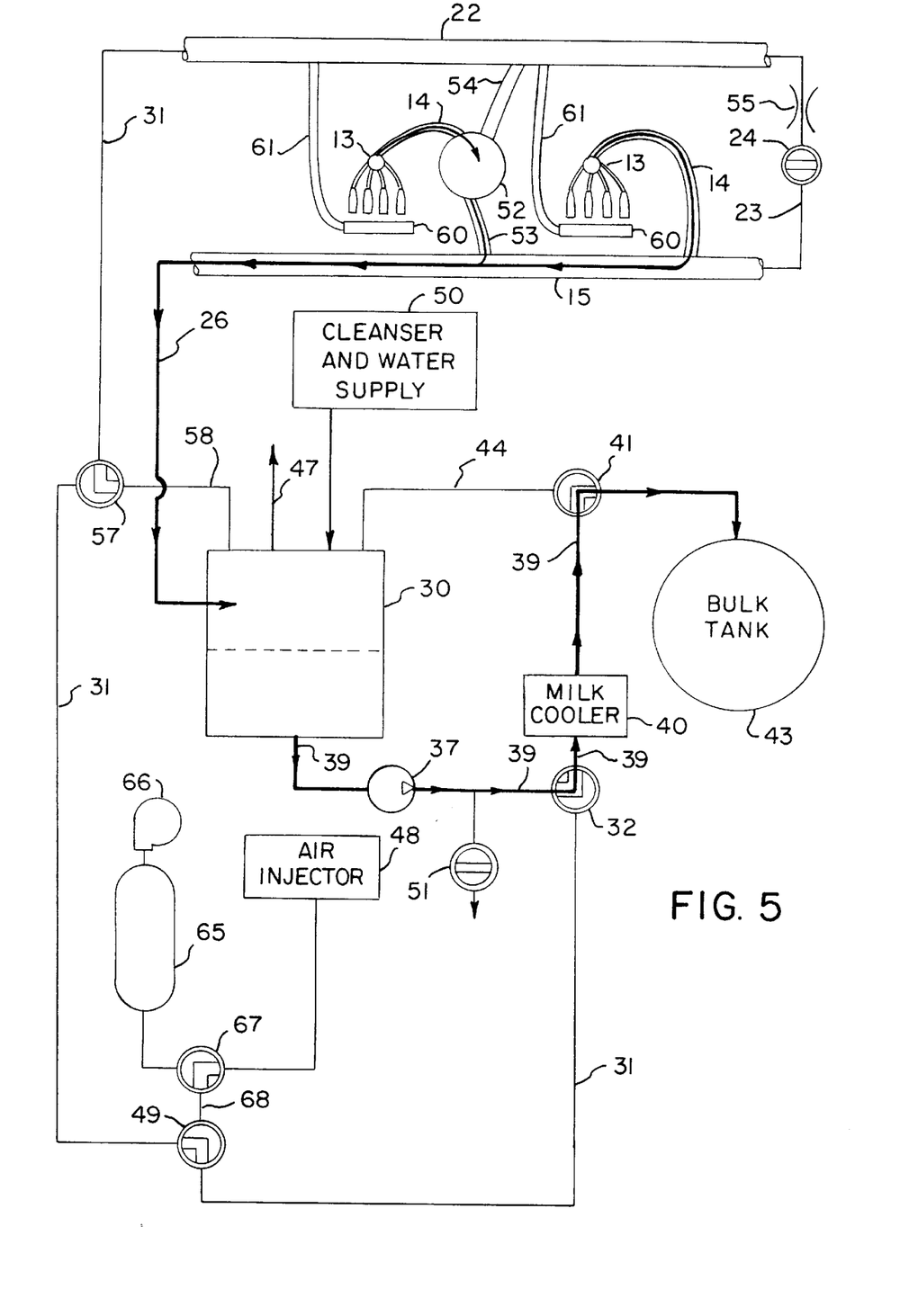
FIG. 5 is a illustrative schematic diagram of the milking parlor washing system of FIGS. 1 or 3, particularly illustrating the path of the flow of milk during the milking process.

The schematic view of FIG. 5 shows the flow of milk during milking operation for either of the systems of FIG. 1 or FIG. 3. Milk flows from the clusters 13 either directly through the milk hose 14 or through the intermediate weigh jar 52 and connecting hose 53 to the milk line 15. The vacuum in the milk line 15 draws the milk through the line 15 to the milk pipeline 26 where the milk is passed to and discharged into the receiver tank 30, with the pipeline 26 preferably joining the receiver tank at an elevational position in the tank above the highest level of the milk that will accumulate within the tank. The vacuum draw on the interior of the tank above the level of the milk provided by the vacuum on the line 47 pulls the milk on the line 26 into the tank. Because the accumulated milk level does not reach the pipeline 26, the vacuum pressure applied to the tank is not required to lift any milk within the tank. At the end of milking of a group of cows, the receiver tank 30 is drained by turning on the milk pump 37, which pumps the milk out of the tank 30 on the lines 39 to the bulk tank 43. At this point in time, the drain valve 51 is closed, the main valve 32 is in the position shown so that it directs milk along the pipeline 39, and the valve 41 at the bulk tank is in a position to direct milk from the pipeline 39 directly into the bulk tank 43, shutting off communication between the bulk tank (or the line 39) to the return line 44. The main valve 32, in its position shown in FIG. 5, also maintains the wash supply line 31 out of communication with the milk pipeline 39. During milking, the valve 24 is closed so that there is no communication between the wash line 22 and the milk line 15.

For a milking system of the type shown in FIGS. 3 and 4, the additional valve 57 that is connected in the wash supply line 31 is in its position shown in FIG. 5 during milking, in which it places that portion of the supply line 31 connected to the wash line 22 into communication, via the stub line 58, with the interior of the receiver tank 30, and thus under vacuum draw. Consequently, vacuum draw is provided from the wash line 22 through the hose 54 to the interior of the weigh jar 52, thereby drawing the milk out of the teat cup cluster 13 into the interior of the weigh jar 52. Where the weigh jars 52 are not used, as in the system shown in FIGS. 1 and 2, the valves 57 and the stub lines 58 are not present, the line 31 is uninterrupted between the valve 32 and the wash lines 22 (except where the one line 31 branches into two lines 31), and the wash lines 22 are simply closed off from the rest of the system during milking.

After a milking shift has been completed, the milker attaches the washer unit 60 to the teat cups 13 at each milking station and opens the valve 24 so that the wash line 22 and the milk line 15 are in communication. The dairyman may now activate the automatic wash-up cycle in accordance with the presence invention. The valves 32, 41 and 57 (where present) are then turned to the positions shown in FIG. 6. The receiver tank 30 is then filled with water (for an initial rinse), or hot water and cleaning solution from the supply 50, and the cleaning cycle begins. When the receiver tank 30 is filled with wash water and chemicals to a desired level, the milk pump 37 is turned on to pump wash water through the milk pipeline 39 to the main valve 32. The valve 32, as explained further below, is either in a position to direct wash water on the line 39 to the valve 41, or in a position to direct wash water into the wash supply line 31 where it passes through the valve 57 (where present) and continues to the wash lines 22. At the wash lines 22, a portion of the wash water passes through the lines 61 and the wash units 60 into the teat cups 13 where the wash water is drawn through either the weigh jar 52 or directly on the hose 14 into the milk line 15. A portion of the wash liquid will also pass through the hose 54 into the weigh jar 52, where the weigh jar is used, and a portion of the wash water will also flow through the bypass line 23, via the open valve 24, from the wash line 22 to the milk line 15, ensuring that the milk line 15 receives wash water along its entire length. Where the weigh jars 52 are utilized, the restrictor 55 in the bypass line 23 ensures that there is sufficient pressure differential between the wash line 22 and the milk line 15 to draw wash water through the weigh jars 52.

Figure 6:
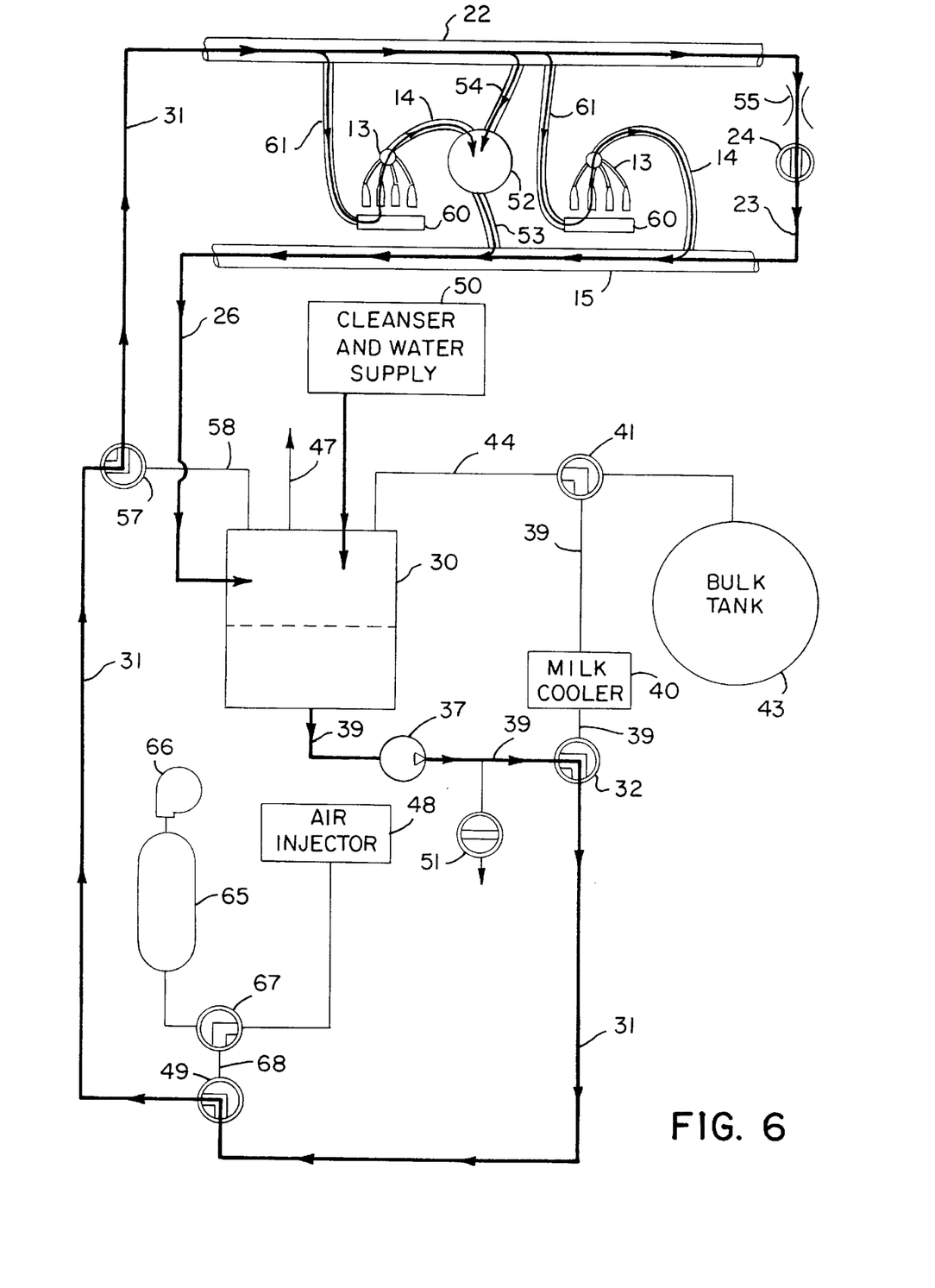
FIG. 6 is a schematic view as in FIG. 5 illustrating the flow of wash water during the wash cycle without air injection.

The main valve 32 may then be switched so that wash water passes through the main valve 32 on the line 39 that leads toward the bulk tank; this water continues to pass through the valve 41, which now seals off the bulk tank from the line 39, and this wash water returns on the return line 44 to the interior of the receiver tank 30.

In the foregoing manner, it is seen that all of the milk pipelines as well as the receiver tank are fully washed with wash water during the washing cycles.

Figure 7:
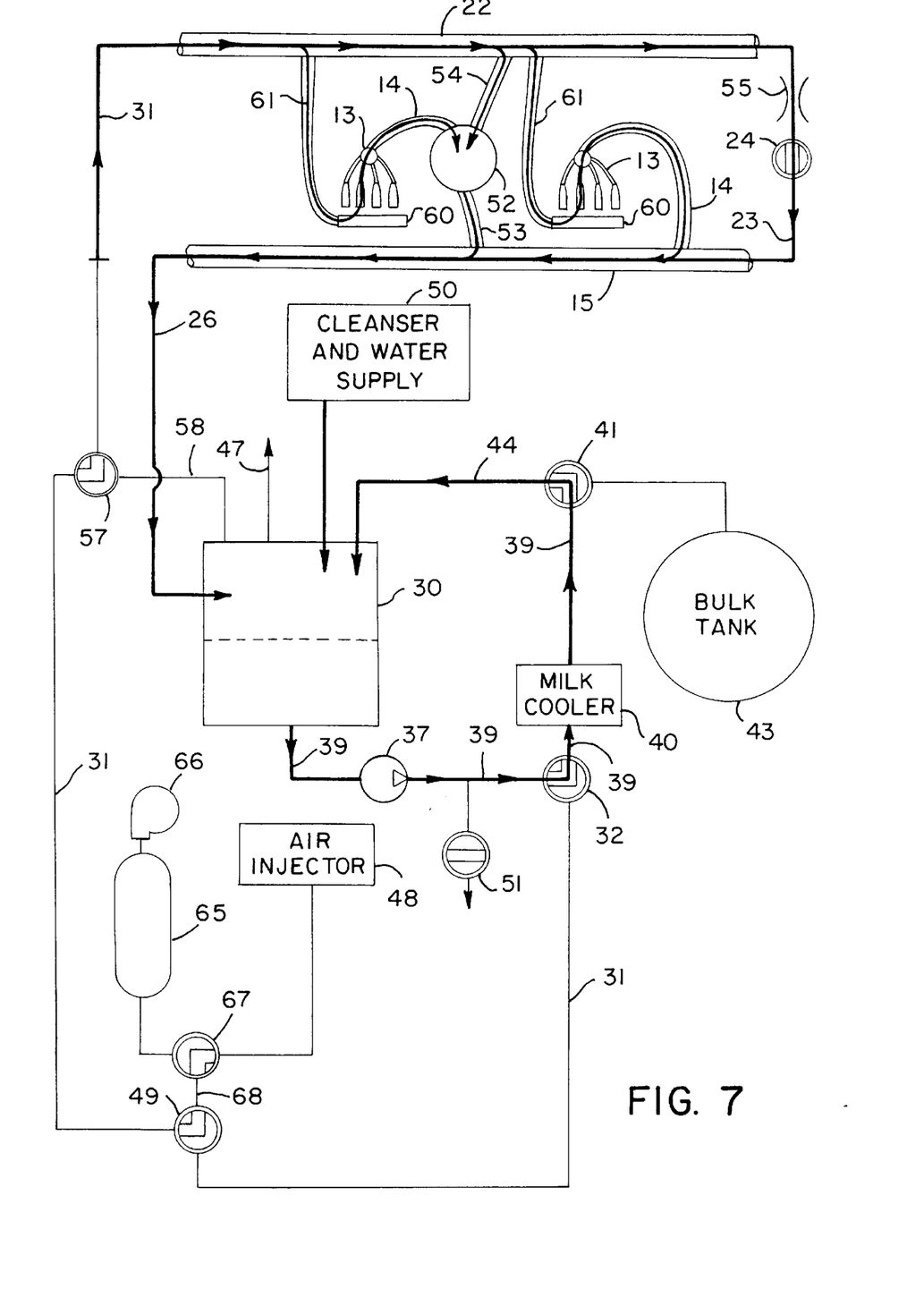
FIG. 7 is a schematic view as in FIG. 5 illustrating the flow of wash water therein during the wash cycle with air injection.

To provide vigorous washing action, the air injector system 48 may be utilized. The valve 49 of the air injector 48 is connected in the wash supply line 31 between the main valve 32 and the wash line 22 (preferably ahead of the valve 57, where that valve is present). As illustrated in FIG. 7, when pulsing air injection is to be utilized, the main valve 32, which may be a three-way valve, is switched to its position shown in FIG. 7, thereby providing wash water on the milk pipeline 39 to the bulk tank valve 41. The air injector 48, which may be of conventional design, controls the valve 49 to open the line 31 to atmospheric air so slugs of wash water separated by air pockets. In accordance with the present invention, a compressed air tank 65 (or other source, such as a blower) supplied by a compressor 66, may be connected by a valve 67 to the line 68 leading to the valve 49, and can be operated to provide a pulse of higher than atmospheric air to the line 31 just behind a slug of wash water to provide initial acceleration of the slug of water, after which the valve 67 is closed and air is allowed to be injected into the line 31 by the air injector in a conventional manner. The injection of compressed air in the foregoing manner allows more rapid acceleration of the slugs of wash water than would otherwise be possible, and ensures that the wash water will circulate through the rest of the system with the assistance of the vacuum draw provided on the receiver tank 30.

Figure 8:
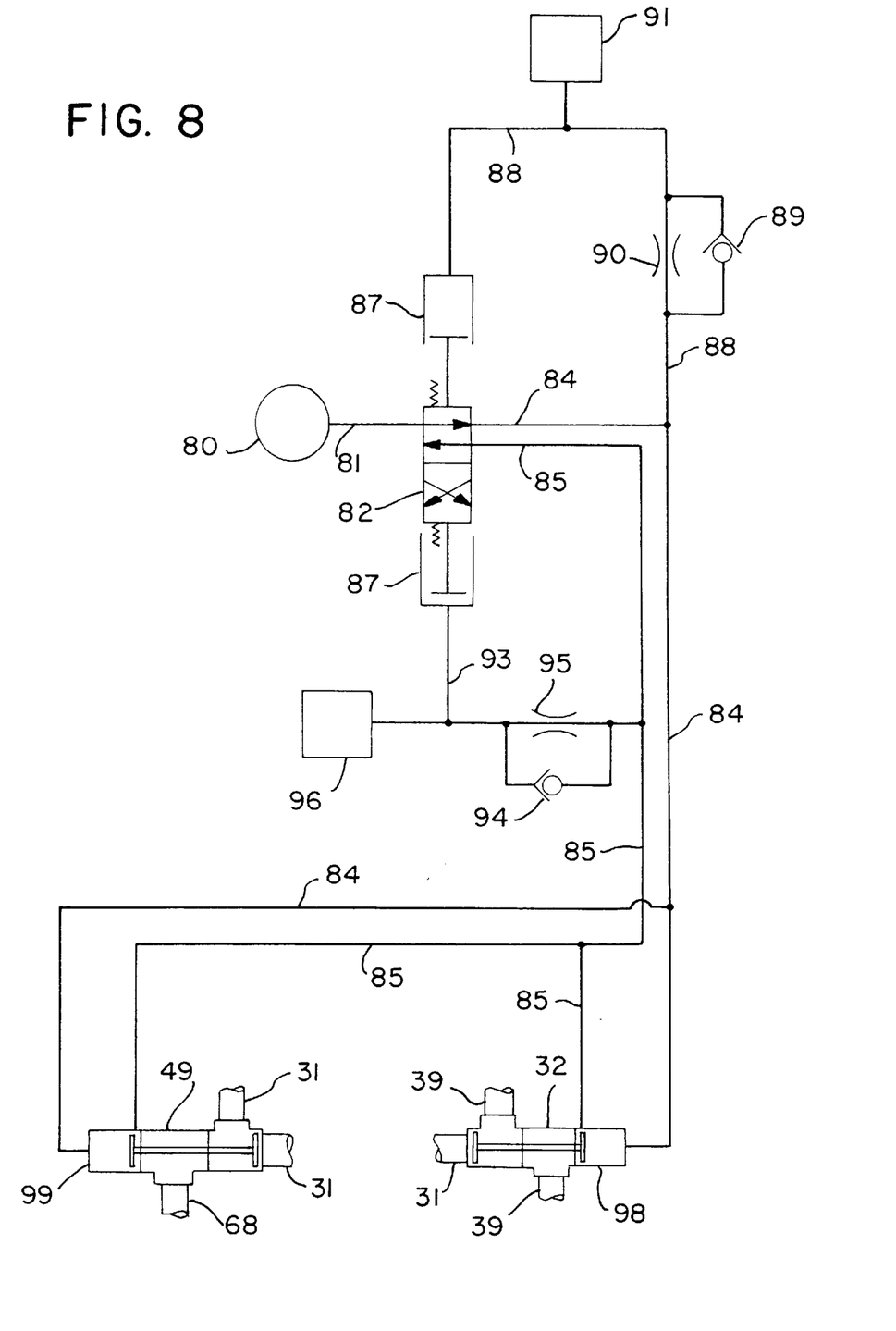
FIG. 8 is a schematic diagram of the controller that operates flow control valves to provide alternating air injection during the wash cycle.

A schematic diagram of an air pressure operated controller for the valves 32 and 49 that provides periodic injection of air is shown in FIG. 8. Air from a source 80, such as a compressor or compressed air tank, is provided on a line 81 to a control valve 82. In its first position, shown in FIG. 8, the valve 82 supplies air under pressure to a line 84 and vents a line 85 to the atmosphere. In the second position of the valve 82, the line 85 is provided with air under pressure and the line 84 is vented to the atmosphere. The valve 82 is switched by an air operated, spring returned plunger-actuator 87 on each side of the valve. A line 88, with a check valve 89 and restrictor 90 in it, extends from the line 84 to one of the actuators 87. A timing chamber 91 is in communication with the line 88. A line 93, with a check valve 94 and restrictor 95 connected in it, extends from the line 85 to the other actuator 87. A timing chamber 96 is in communication with the line 93. The line 84 has branches that extend to one side of the actuators 98 and 99 of the valves 32 and 49, respectively. Similarly, the line 85 has branches that extend to the other side of the actuators 98 and 99 of the valves 32 and 49, respectively. When the valve 82 is in its position shown in FIG. 8, the valve 32 is switched as shown to provide wash water throughout the line 39, and the valve 49 is switched to provide air from the air injector 48 (or compressed air from the source 65) into the line 31. Air under pressure from the line 84 passes through the restrictor 90 into the chamber 91 and pressure in the chamber 91 increases at a selected rate. After a predetermined time period, the pressure in the chamber 91 exceeds the trip pressure of the actuator 87, which then drives the valve 82 to its second position. This causes the valves 32 and 49 to be switched. It also vents the line 84 to the atmosphere, discharging the pressurized air in the chamber 91 through the check valve 89. Air under pressure from the line 85 passes through the restrictor 95, building up pressure in the chamber 96, which, after a predetermined time, is sufficient to cause the actuator 87 to drive the valve 82 back to its first position. By selection of the timing chambers 91 and 91 and the restrictors 90 and 95 (which may be adjustable) the time periods in which the valve 82 dwells in its two positions may be selected. The dwell times in each position of the valve 82 may be unequal.

After completion of the washing cycle, the drain valve 51 may then be opened and the pump 37 operated to rapidly drain liquid out of the system through the drain valve 51 into a sewer or other drainage system.

It is understood that invention is not confined to the particular construction and arrangement of parts herein illustrated and described, but embraces all such modified forms thereof as come within the scope of the following claims.

What is claimed is:

1. A milk receiver and washing apparatus for use in a dairy of the type having a milking parlor with a milk line in the parlor, a wash line in the parlor, milking stations in the parlor each having a teat cup milking cluster connected by a hose to the milk line at each station and a clean-in-place washer unit connected by a hose to the wash line and connectable to the teat cups of the milking cluster for wash up, and a bulk milk tank outside the milking parlor, the apparatus comprising:

(a) a receiver tank located at a distance from the milk line and wash line, the receiver tank connectable to a vacuum pump so that the interior of the receiver tank may be placed under a vacuum draw, and wherein wash water and sanitizing chemicals may be selectively discharged into the receiver tank;

(b) a milk pipeline extending from the milk line to the receiver tank to transfer milk from the milk line to the receiver tank, and a milk pipeline extending from the receiver tank to the bulk tank to transfer milk from the receiver tank to the bulk tank;

(c) a milk pump connected in the milk pipeline between the receiver tank and the bulk tank;

(d) a main valve connected in the milk pipeline between the milk pump and the bulk tank;

(e) a bulk tank bypass valve connected in the milk pipeline between the main valve and the bulk tank;

(f) a wash supply line extending from the main valve to the wash line, the main valve switchable between positions to provide fluid from the milk pipeline pumped by the milk pump to the milk pipeline leading to the bulk tank alone in a first position and to the wash supply line in a second position;

(g) a wash return line extending from the tank bypass valve to the receiver tank, the tank bypass valve switchable between a position in which the bypass valve supplies milk from the milk pipeline to the bulk tank to a position in which fluid from the milk pipeline bypasses the bulk tank and is supplied to the wash return line;

whereby during milking operations, the receiver tank may be placed under vacuum draw to draw milk into the receiver tank from the milk line, the receiver tank may be periodically drained of milk by operating the milk pump to pump milk through the milk pipeline and through the main valve positioned to direct milk on the milk pipeline to the tank bypass valve positioned to direct the milk therethrough into the bulk tank, and, after a milking shift has been completed, the clean-in-place washer units may be connected by a milker to the teat cup clusters in the milking parlor, the receiver tank filled with wash water and sanitizing chemicals, and the milk pump then operated to provide wash water under pressure through the milk pipeline to the main valve which may be switched to alternatively provide the wash water to the wash supply line and to the milk pipeline, to provide cleansing of the milk pipelines, teat cup clusters and associated hoses.

2. The apparatus of claim 1 further including a bypass line in the milking parlor connected between the wash line and the milk line, and a bypass line shutoff valve connected in the bypass line, the bypass line shutoff valve switchable between a position passing fluid through the valve to a position blocking the flow of fluid, whereby the bypass line shutoff valve can be positioned by the dairyman to block the flow of fluid therethrough during milking, and after milking and before the wash up operation, the bypass line shutoff valve may be switched by the dairyman to its position passing fluid therethrough whereby wash water in the wash line may pass through the bypass line to the milk line to provide cleaning of all portions of the milk line.

3. The apparatus of claim 2 further including a flow restrictor in the bypass line.

4. The apparatus of claim 1 further including air injector means connected in the wash supply line for injecting air periodically into the wash supply line during wash up such that the wash water moves through the wash line as slugs of water separated by air pockets to provide enhanced scrubbing action of wash water through the milk pipeline, and wherein the main valve is switched during operation of the air injector means to alternately provide wash water to the wash supply line and to the milk pipeline, the air injector means injecting air into the wash supply line only when the main valve provides wash water to the milk pipeline.

5. The apparatus of claim 4 further including means for providing an initial pulse of compressed air to the wash supply line prior to the air injector means providing air to the wash supply line, such that the initial pulse of compressed air provides initial acceleration of the slug of water in the wash supply line to enhance the movement of the slug of water through the line.

6. The apparatus of claim 4 wherein the air injector means includes a valve in the wash supply line which may be switched between a position passing fluid on the wash supply line therethrough to a position providing air to the wash supply line.

7. The apparatus of claim 6 including means for switching the main valve and the air injector means valve together in a periodic manner.

8. The apparatus of claim 1 further including a drain valve having open and closed positions connected to the milk pipeline between the pump and the main valve, the drain valve being normally closed during the pumping of milk or wash water through the milk pipeline to which the main valve is connected, whereby after wash up has been completed, the drain valve may be opened and the milk pump operated to discharge the wash water within the receiver tank through the pump and through the drain valve to a drain.

9. The apparatus of claim 1 adapted for use with milking parlors of the type having weigh jars connected to the teat cup clusters and to the milk line such that milk flows from the teat cup clusters to the weigh jars and then to the milk line, the weigh jars requiring a source of vacuum to draw milk from the teat cup clusters to the weigh jars, the apparatus further including a valve connected in the wash supply line between the main valve and the wash line and also connected to a line connected to the receiver tank to be in communication with the vacuum in the interior of the receiver tank, the valve switchable from a first position in which fluid is passed on the wash supply line directly through the valve and the line connected to the receiver tank is blocked off to a second position in which the wash supply line connected to the main valve is blocked off and communication is provided between the line connected to the receiver tank and that portion of the wash supply line between the valve and the wash line, whereby in the second position the wash line will have vacuum applied thereto from the vacuum in the receiver tank such that the weigh jars can be connected to the wash line to provide a source of vacuum to the weigh jars.

10. The apparatus of claim 9 further including a bypass line in the milking parlor connected between the wash line and the milk line, and a bypass line shutoff valve connected in the bypass line, the bypass line shutoff valve switchable between a position passing fluid through the valve to a position blocking the flow of fluid, whereby the bypass line shutoff valve can be positioned by the dairyman to block the flow of fluid therethrough during milking, and after milking and before the wash up operation, the bypass line shutoff valve may be switched by the dairyman to its position passing fluid therethrough whereby wash water in the wash line may pass through the bypass line to the milk line to provide cleaning of all portions of the milk line, and a flow restrictor in the bypass line.

11. The apparatus of claim 1 wherein the milk pipeline and the wash supply line extending from the receiver tank to the milking parlor are mounted in close proximity to each other.

12. The apparatus of claim 1 wherein the milk pipeline extending from the milk line to the receiver tank is at the same level as or lower than the milk line and enters the receiver tank at a position above the level of milk in the receiver tank.

13. The apparatus of claim 12 wherein the receiver tank is located in a pit having a floor that is lower than a floor of the milking parlor.

14. The apparatus of claim 1 wherein the milking parlor is of the type having two sides with a milk line on each side, and wherein there is a separate milk pipeline extending from each milk line to the receiver tank.

15. The apparatus of claim 14 wherein each milk pipeline extending between the milklines and the receiver tank is at the same level as or lower than the milk line to which it is connected and enters the receiver tank at a position above the level of milk in the receiver tank.

16. The apparatus of claim 15 wherein the receiver tank is located in a pit having a floor that is lower than a floor of the milking parlor.

17. The apparatus of claim 15 wherein the milk pipelines and the wash supply lines extending from the receiver tank to the milking parlor are mounted in close proximity to each other.

18. A method of carrying out milking and wash up of the milking equipment and pipelines in a dairy of the type having a milking parlor with a milk line in the parlor, a wash line in the parlor, milking stations in the parlor each having a teat cup milking cluster connected to the milk line by a hose at each station and a clean-in-place washer unit connected by a hose to the wash line and connectable to the teat cups of the milking cluster for wash up, and a bulk milk tank outside the milking parlor, the method comprising the steps of:

(a) providing a receiver tank located at a distance from the milk line and wash line and during milking connecting the interior of the receiver tank by a milk pipeline to the milk line and applying a vacuum draw to the receiver tank to draw milk from the milking clusters through the milk line and milk pipeline into the receiver tank;

(b) after a group of cows has been milked and the receiver tank contains a quantity of milk therein, pumping the milk out of the receiver tank through a milk pipeline to a bulk tank to transfer all of the milk from the receiver tank to the bulk tank;

(c) after a shift of milking has been completed, filling the receiver tank with wash water to a selected level and connecting the clean-in-place washer units at each milking station to the teat cups at the milking station;

(d) pumping wash water out of the receiver tank alternately (1) through the milk pipeline that extends to the bulk tank and diverting the wash water at the bulk tank so that none enters the bulk tank and returning the wash water to the receiver tank to circulate the wash water therethrough, and (2) through a wash supply line to the wash line, thence from the wash line to the clean-in-place washer units to the teat cup clusters connected thereto and thence to the milk line, and from the milk line directing the wash water back through the milk pipeline to the receiver tank to provide a circulation of wash water.

19. The method of claim 18 wherein after wash water has been circulated for a selected period of time, stopping the circulation of wash water and drawing the wash water in the milk pipelines back into the receiver tank and pumping the wash water out of the receiver tank into a drain.

20. The method of claim 18 further including the step of injecting air into the wash supply line when wash water is not supplied through the wash supply line, such that wash water moves as slugs of water separated by air pockets between the wash line and the milk line to provide enhanced scrubbing of the teat cup clusters and associated hoses.

21. The method of claim 20 further including the step of providing an initial pulse of compressed air to the wash supply line between each slug of water in the wash supply line and before injecting air into the wash supply line such that the initial pulse of compressed air provides initial acceleration of the slugs of water in the wash supply line to enhance the movement of the slugs of water through the line.

22. The method of claim 18 wherein the milking parlor is of the type having a milk weigh jar at each milking station that is connected to the teat cup cluster to receive milk therefrom and the weigh jar is connected to the milk line to supply milk from the weigh jar to the milk line, comprising the further steps of connecting the weigh jar to the wash line by a hose, and during milking, connecting the interior of the receiver tank that has a vacuum draw applied thereto to the wash line to provide vacuum draw from the receiver tank to the wash line and thence to the interior of the weigh jars.

23. The method of claim 22 further including the step during wash up of bypassing wash water from the wash line to the milk line through a bypass line having a flow restrictor therein to provide wash water from the wash line to the milk line through the entire length of the milk line, whereby the restrictor in the bypass line serves to enhance diversion of wash water from the wash line to the milk line through the clean-in-place wash units, the teat cup clusters and the weigh jars.

24. The method of claim 18 wherein the milk pipeline extends from the milk line to the receiver tank at a level that is the same as or lower than the milk line, and wherein the milk pipeline enters the receiver tank at a position which is above the level of milk in the tank so that as milk is drawn from the milk line to the receiver tank, the milk is never lifted vertically.

\* \* \* \* \*